United States Patent
Yunoue et al.

(10) Patent No.: US 6,244,369 B1
(45) Date of Patent: Jun. 12, 2001

(54) CAB FOR CONSTRUCTION MACHINERY

(75) Inventors: Masayuki Yunoue, Chiyoda-machi; Fumimasa Saeki, Koga-gun; Yoshiaki Yamazaki, Gamo-gun, all of (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 09/446,020

(22) PCT Filed: May 24, 1999

(86) PCT No.: PCT/JP99/02702

§ 371 Date: Dec. 16, 1999

§ 102(e) Date: Dec. 16, 1999

(87) PCT Pub. No.: WO99/61711

PCT Pub. Date: Feb. 12, 1999

(30) Foreign Application Priority Data

May 26, 1998 (JP) .................................................. 10-161367

(51) Int. Cl.[7] .................................................. B62D 33/06
(52) U.S. Cl. .................................. 180/89.12; 296/190.08; 296/190.11
(58) Field of Search ............................. 180/89.12, 89.13; 296/190.01, 190.08, 190.11, 190.03

(56) References Cited

U.S. PATENT DOCUMENTS 5,016,721 * 5/1991 Yamamoto et al. ............... 180/89.13
5,577,795 * 11/1996 Shinsen ................................. 296/190

FOREIGN PATENT DOCUMENTS 1-198929   8/1989   (JP) .
6-67737    9/1994   (JP) .
7-216936   8/1995   (JP) .

* cited by examiner

Primary Examiner—Paul N. Dickson
(74) Attorney, Agent, or Firm—Mattingly, Stanger & Malur (57) ABSTRACT

An operator's cab structure for a construction machine, arranged to minimize the degree of lateral projection of a cab door on the outer side of a left enclosure section, for the purpose of securing a broader dwelling space within a cab. A side panel or wall portion which is provided in a left side enclosure section of a cab box is located in a receded position inward of outer marginal edges of a ceiling enclosure section. By this arrangement, an open door accommodating space is formed or defined on the rear side of the left side enclosure section by an outer surface of the side wall portion, lower surface of the ceiling enclosure section and rear surface of a center pillar. As a consequence, when the cab door is opened, it is received in the open door accommodating space to minimize the extent of lateral projection of the door on the outer side of the left enclosure section. Accordingly, it becomes possible to increase the width of the cab box to secure a broader dwelling space within the cab in the transverse direction.

7 Claims, 8 Drawing Sheets

CAB FOR CONSTRUCTION MACHINERY

TECHNICAL FIELD

This invention relates to an operator's cab structure suitable for use, for instance, on a rotary construction machine such as a hydraulic power shovel and the like, and more particularly to an operator's cab structure especially suitable for use on a rotary construction machine having a relatively small radius of rotation.

BACKGROUND ART

Hydraulic power shovels which are widely used as construction machines, are generally constituted by a lower travelling truck body, an upper rotary body which is rotatably mounted on the lower truck body, and a working mechanism which is provided on a front portion of the upper rotary body.

The upper rotary body is largely constituted by a rotary frame in the form of a frame structure, an operator's cab which is mounted on a left-hand front portion of the rotary frame and internally provided with an operator's seat along with a number of operation control levers of the machine, a housing cover which is extended from right to a rear side of the cab and defining a machine chamber to accommodate an operating fluid tank, an engine, a hydraulic pump and other components on the rotary frame, and a counterweight attached to the rear end of the rotary frame as a balancing member relative to the working mechanism.

The operator's cab is constituted by a cab box, a box-like enclosure including a front side section, rear side section, left side section, right side section and top side or ceiling section, and a door which is attached to a center portion of its left side section and movable between a front closed position and a rear open position.

In connection with hydraulic power shovels, as disclosed in Japanese Patent Laid-Open Publication No. H1-198929, for example, there has been known in the art a within machine width revolving type or minimal radius revolving type hydraulic power shovel (hereinafter referred to as "small radius revolving type hydraulic power shovel) which is arranged to turn an upper rotary body within the width of the machine.

In the case of the prior art small radius revolving type hydraulic power shovel which is disclosed in Japanese Patent Laid-Open Publication No. H1-198929, the upper rotary body is arranged substantially in a circular shape when viewed from above, concentrically around the center of its rotation. By this arrangement, the upper rotary body of the hydraulic power shovel is prevented from hitting against an obstacle or a surrounding structure during its rotational movements.

In some cases, the door of the cab is left wide open on the rear side of the cab box during operation of the hydraulic power shovel, for ventilating purposes or when it becomes necessary for the operator to exchange words with someone outside the machine.

Therefore, according to the prior art hydraulic power shovel, in order to retain the cab door always within the radius of rotational movements of the upper rotary body even when it is left open as described above, the left side of the cab box which contains the door is located at an indented position inward of the radius of rotational movements, more particularly, at a position which is receded by a distance which corresponds to the dimension over which the door is projected laterally on the left side of the cab box when fully opened.

In the case of the above-mentioned conventional small radius revolving type hydraulic power shovel, due to location of the left side of the cab box in an indented position inward of the radius of rotational movements of the upper rotary body, the cab box is necessarily reduced in width, in other words, in spatial capacity between the right and left sides of the cab box.

Therefore, the dwelling space in the cab becomes narrowed down in the transverse direction to such a degree as to arouse oppressive feelings on the part of the operator, and degradations of the working environment and maneuverability of various operation control levers and pedals.

DISCLOSURE OF THE INVENTION

In view of the above-mentioned problems with the prior art, it is an object of the present invention to provide an operator's cab structure for construction machines, which is arranged particularly to minimize the extent of lateral projection of a cab door which is normally projected to an objectionable degree when opened, and to secure a broader dwelling space within the cab.

According to the present invention, there is provided an operator's cab structure for a construction machine which includes a cab box mounted on an upper rotary body which is rotatably mounted on a lower truck body, said cab box having enclosure sections on a front side, rear side, left side, right side and top or ceiling side thereof, and a door attached substantially to a center portion of the left side enclosure section and movable between a or front closed position and a rear open position.

In order to solve the above-mentioned problems, the operator's cab structure according to the present invention is characterized in that the cab box includes: a left side enclosure section having a vertical center pillar erected substantially in an intermediate position between fore and rear ends thereof, a passage opening to be opened and closed by the door and defined on the front side of the center pillar by bordering edges of the center pillar, front side enclosure section and ceiling enclosure section, and a side wall portion provided on the rear side of said center pillar and circumvented by the center pillar, rear enclosure section and ceiling enclosure section; the side wall portion being located in a receded position inward of outer marginal edges of the ceiling enclosure section, and defining an open door accommodating space on the outer side thereof in cooperation with a lower side portion of the ceiling enclosure section and a rear side portion of the center pillar to accommodate the door when moved to the rear open position.

With the arrangements just described, when the cab door is opened, it is received in the open door accommodating space in such a way as to minimize the extent of lateral projection of the door. Therefore, this makes it possible to locate the left side enclosure section in an outer position on the upper rotary body of the machine, that is to say, to increase the width of the cab box so as to secure a broader dwelling space within the cab.

In this instance, preferably the passage opening and side wall portion of the left side enclosure section are arranged in a shallow V-shape and located on the front and rear sides of the center pillar which is located in a leftmost projected position at the apex of the V-shape.

With the arrangements just described, the left side enclosure section can be efficiently located within or inward of an arc which is drawn by a radius of rotational movements of the upper rotary body, and the width of the cab box as a whole can be increased to provide a broader dwelling space within the cab.

Further, preferably the cab door is supported on the center pillar through hinges which are substantially embedded in sunken portions of the center pillar.

With the arrangements just described, the left side enclosure section of the cab box can be located closer to the radius of rotational movements of the upper rotary body to increase the width of the cab box as a whole.

Further, preferably the open door accommodating space is located in a receded position by such a distance as to hold the cab door in the open position inward of a radius of rotational movements of the upper rotary body as determined by dimensions of a counterweight provided on the upper rotary body.

With the arrangements just described, when the cab door is opened, it can be retained within the radius of rotational movements of the upper rotary body. Therefore, even if the cab door is left in the open position during rotation of the upper rotary body, there is no possibility of the opened door hitting against a surrounding structure or obstacle.

Further, preferably outer marginal edges of the ceiling enclosure section are formed in a pentagonal shape, and the side wall portion of the left side enclosure section is located in a position which is receded inward by a predetermined measure from outer marginal edges of the ceiling enclosure section in such a way that a pent-roof or pentagonal shaped roof is formed by a lower surface of the ceiling enclosure section.

With the arrangements just described, the ceiling enclosure section is formed in a pentagonal shape, when viewed from above, with smooth outer marginal edges free of notches or grooves.

Further, according to the present invention, an open door lock may be provided on the side wall portion of the left side enclosure section to lock the cab door in its open position.

With the arrangements just described, when the cab door is opened, it can be locked to the side wall or panel portion of the left side enclosure section of the cab box through the open door lock, thereby preventing the cab door from going into spontaneous flapping movements during operation of the machine.

Further, according to the present invention, an engine cover may be provided on the rear side of the cab box, the engine cover including a front extension portion which is extended as far as the side wall portion of the left side enclosure section and provided with a chamfered surface substantially flush with the side wall portion.

With the arrangements just described, for instance, even in the case of a small radius revolving type construction machine where a cab box and a housing cover are located in an overlapping relation with each other in the longitudinal direction to such a degree as the cab door would normally reach the fore extension of the housing cover when opened, the chamfered surface portion prevents contact between the door and the housing cover to preclude damages thereto.

BEST MODE FOR CARRYING OUT THE INVENTION

Hereafter, the present invention is described more particularly with reference to FIGS. 1 through 8 by way of a operator's cab which is applied as an example to a small radius revolving type hydraulic power shovel.

In the drawings, denoted at 1 is a lower truck body with a pair of crawler belts 1A and 1A at the opposite sides thereof, and designated at 2 is an upper rotary body which is rotatably mounted on the lower truck body 1. A front portion of the upper rotary body 2 is provided with a working mechanism (not shown) which is for example provided with a working member to be lifted up and down for excavating earth or for other ground work.

Figure 1:
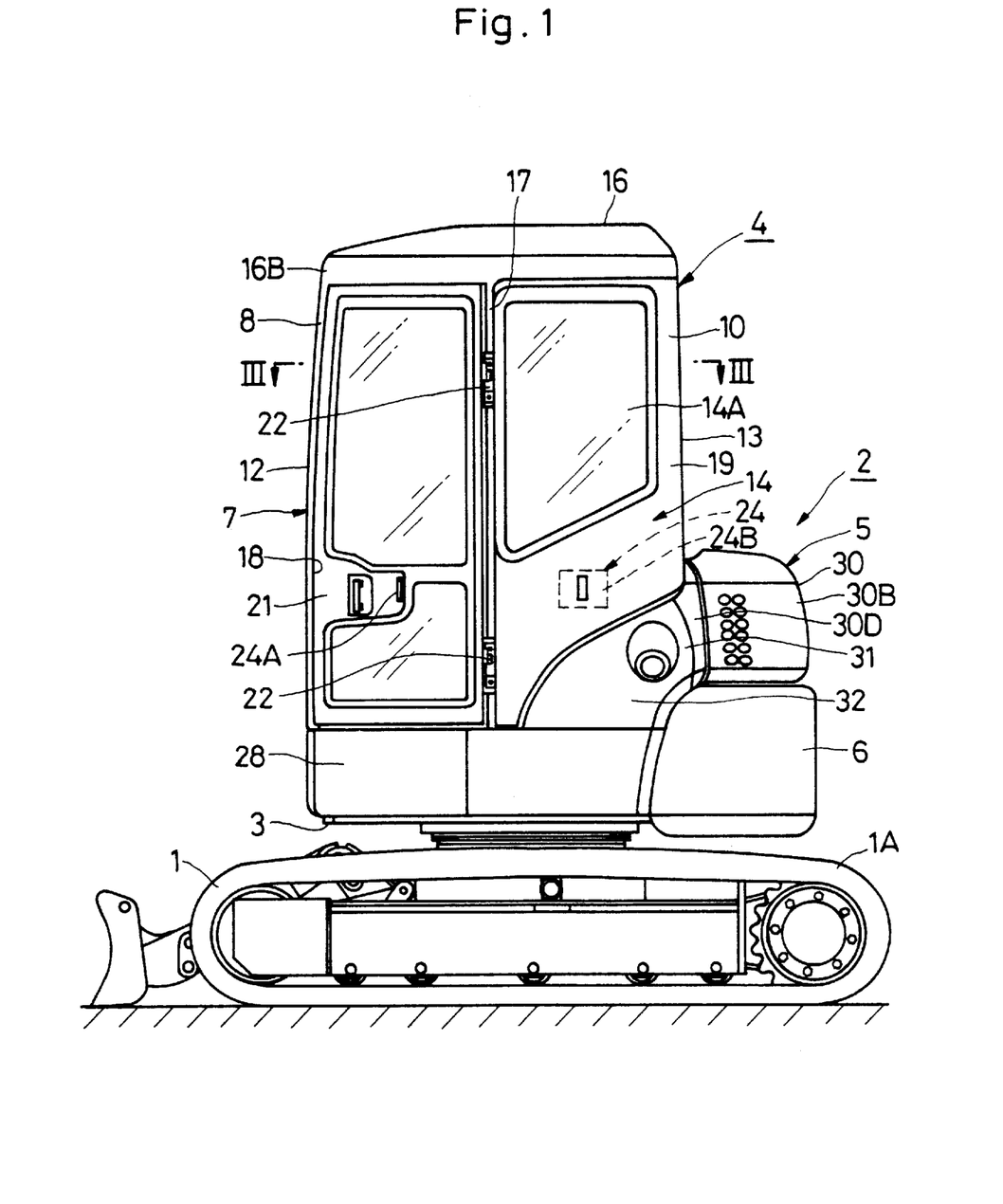
FIG. 1 is a schematic front view of a hydraulic power shovel shown as a embodiment of the present invention.
Figure 2:
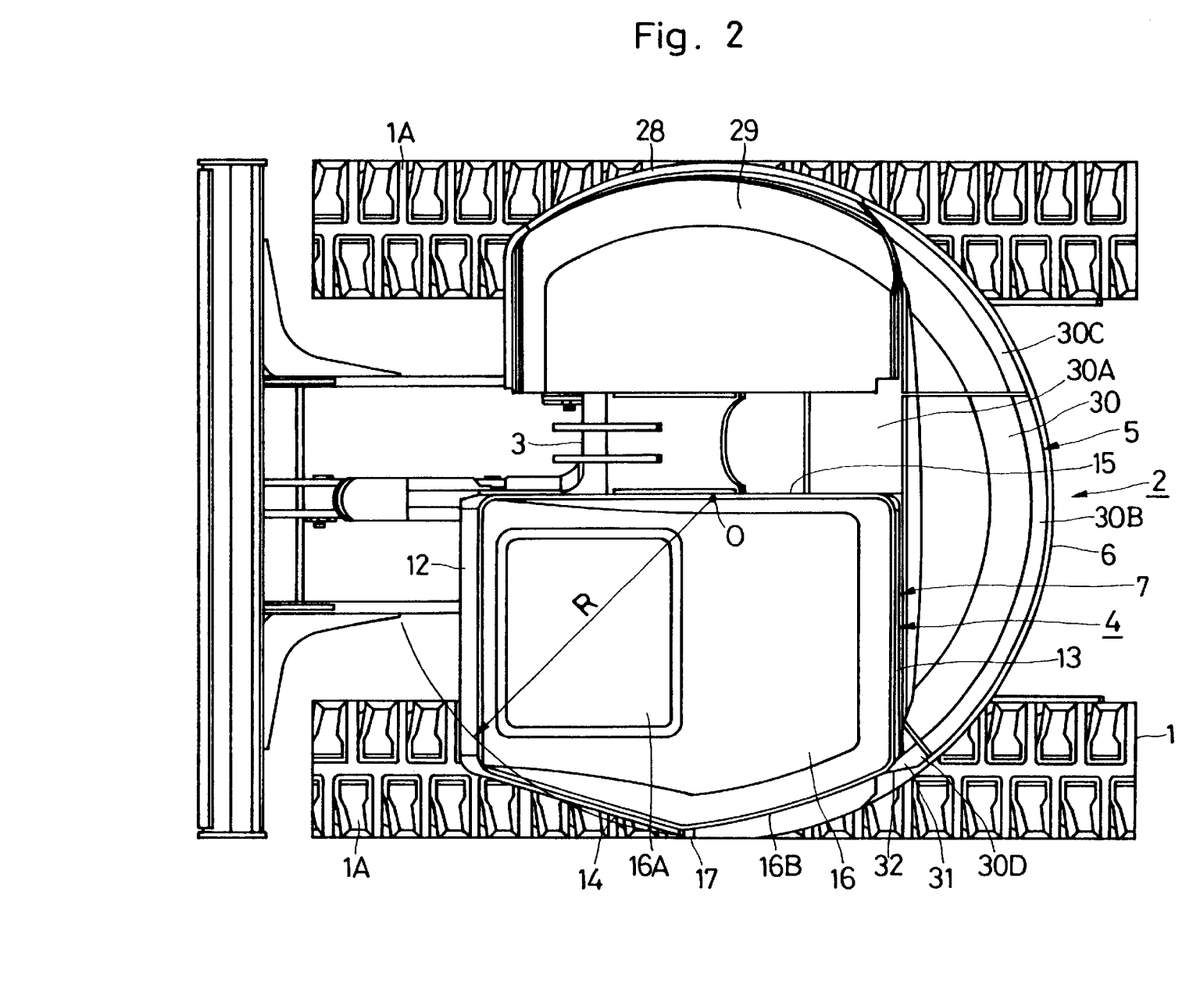
FIG. 2 is a plan view on an enlarged scale of the hydraulic power shovel.

As shown in FIGS. 1 and 2, the upper rotary body 2 is largely constituted by a rotary frame 3, an operator's cab 4 which is mounted on a left front portion of the rotary frame 3 and comprised of a cab box 7 and a door 21 as will be described hereinafter, a housing cover 5 which is provided along and around the right and rear sides of the cab 4 and comprised of a side cover 29 and an engine cover 30 as will be described hereinafter, and a counterweight 6 which is attached to the rear end of the rotary frame 3.

Figure 3:
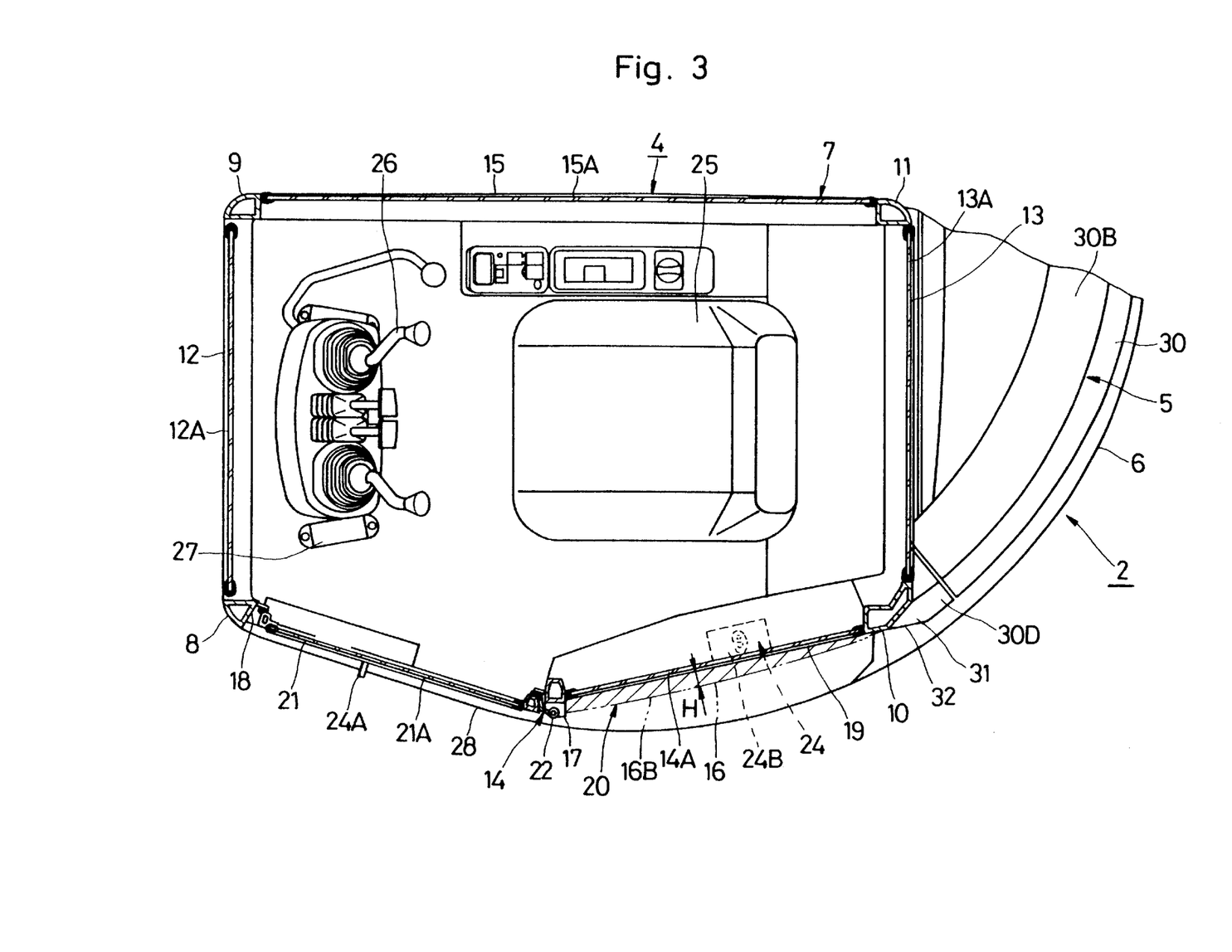
FIG. 3 is a horizontal sectional view taken on line III—III of FIG. 1, showing an operator's cab on an enlarged scale along with an operator's seat.

Denoted at 7 is the cab box which constitutes a main structure of the operator's cab 4. As shown in FIG. 3, the cab box 7 is largely constituted by an enclosure including a left front pillar 8, a right front pillar 9, a left rear pillar 10, a right rear pillar 11, a front side enclosure section 12, a rear side enclosure section 13, a left side enclosure section 14, a right side enclosure section 15 and a ceiling enclosure section 16. In this instance, the left front pillar 8 and right front pillar 9 are located in front positions which are spaced apart from each other in the transverse direction. On the other hand, the left rear pillar 10 and right rear pillar 11 are located in rear positions which are also spaced apart from each other in the transverse direction. The front side enclosure section 12 is provided between the left front pillar 8 and the right front pillar 9, and fitted with a pane of front window glass 12A. The rear side enclosure section 13 is provided between the left rear pillar 10 and the right rear pillar 11, and fitted with a pane of rear window glass 13A. The left side enclosure section 14 is provided between the left front pillar 8 and the left rear pillar 10, and fitted with a pane of left side window glass 14A. The right side enclosure section 15 is provided between the right front pillar 9 and the right rear pillar 11, and fitted with a pane of right side window glass 15A. The ceiling enclosure section 16 is provided on top of the front side enclosure section 12, rear side enclosure section 13, left side enclosure section 14 and right side enclosure section 15, and fitted with a pane of top window glass 16A.

Figure 4:
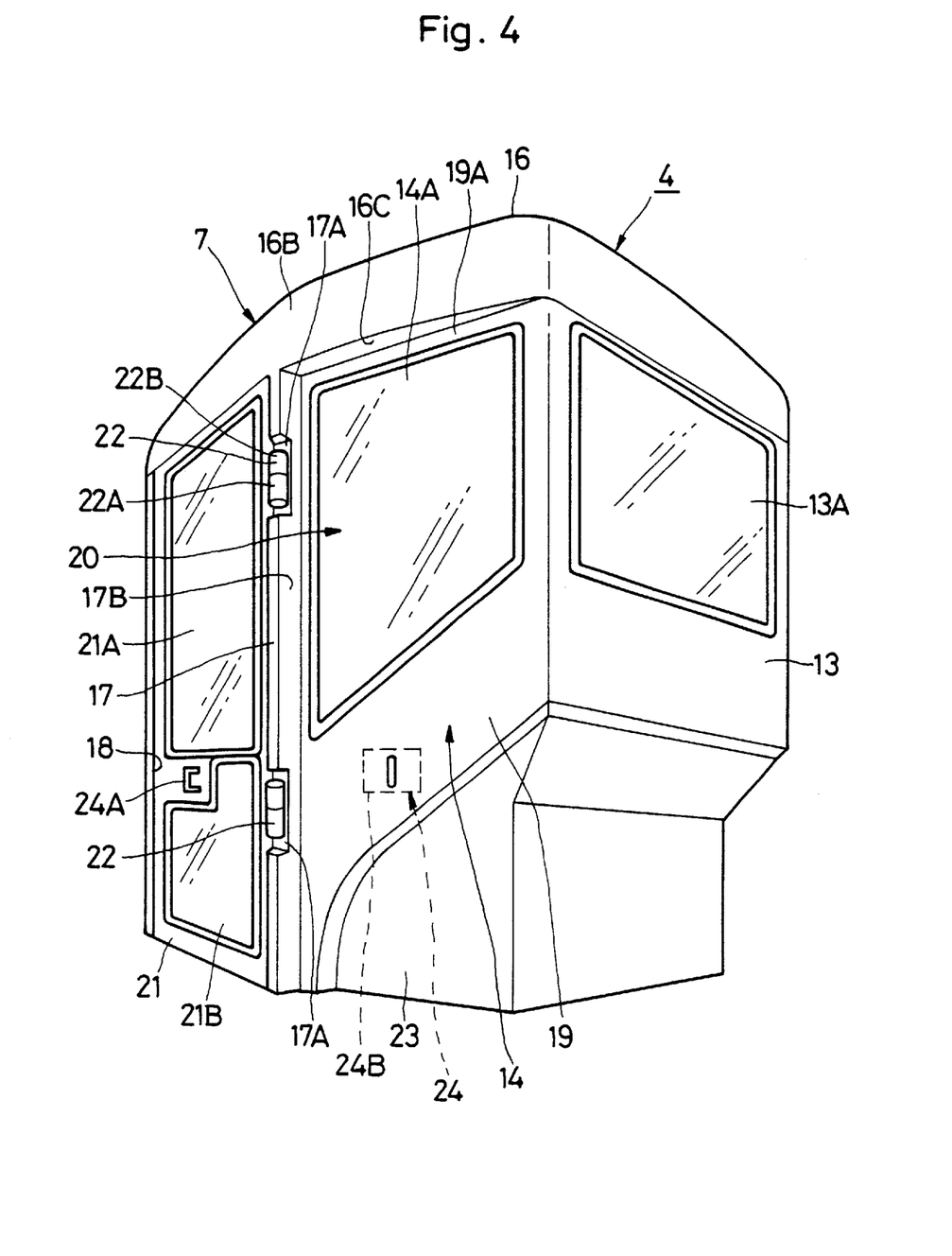
FIG. 4 is a perspective view of the operator's cab taken obliquely from behind.

Further, as shown in FIGS. 3 and 4, the left side enclosure section 14 is comprised of a center pillar 17, a passage opening 18 and a side wall or panel portion 19. In this instance, the center pillar 17 is located substantially in an intermediate position between the front and rear sides of the cab box, and extended in the vertical direction. The passage opening 18 is provided on the front side of the center pillar 17, and defined and circumvented by the center pillar 17, front enclosure section 12 and ceiling enclosure section 16, and the passage opening 18 is opened and closed by a door 21. The side wall portion 19 is located on the rear side of the center pillar 17, and circumvented by the center pillar 17, rear enclosure section 13 and ceiling section 16. The above-mentioned side pane of glass 14A is fitted in the side wall or panel section 19. The center pillar 17 is provided with hinge receptacle recesses 17A in two vertically spaced positions to receive door hinges 22 which are attached to the center pillar as will be described hereinafter.

In this instance, the side wall portion 19 is provided in an inwardly receded position as compared with outer marginal edges 16B of the ceiling section 16. As a result, a door accommodating space 20 (indicated by hatching in FIG. 3) is defined in a rear portion of the left side enclosure section 14 by outer surface 19A of the side wall portion 19, lower surface 16C of the ceiling section 16, which forms a pent-roof or pentagonal shaped roof portion, and rear surface 17B of the center pillar 17.

Figure 6:
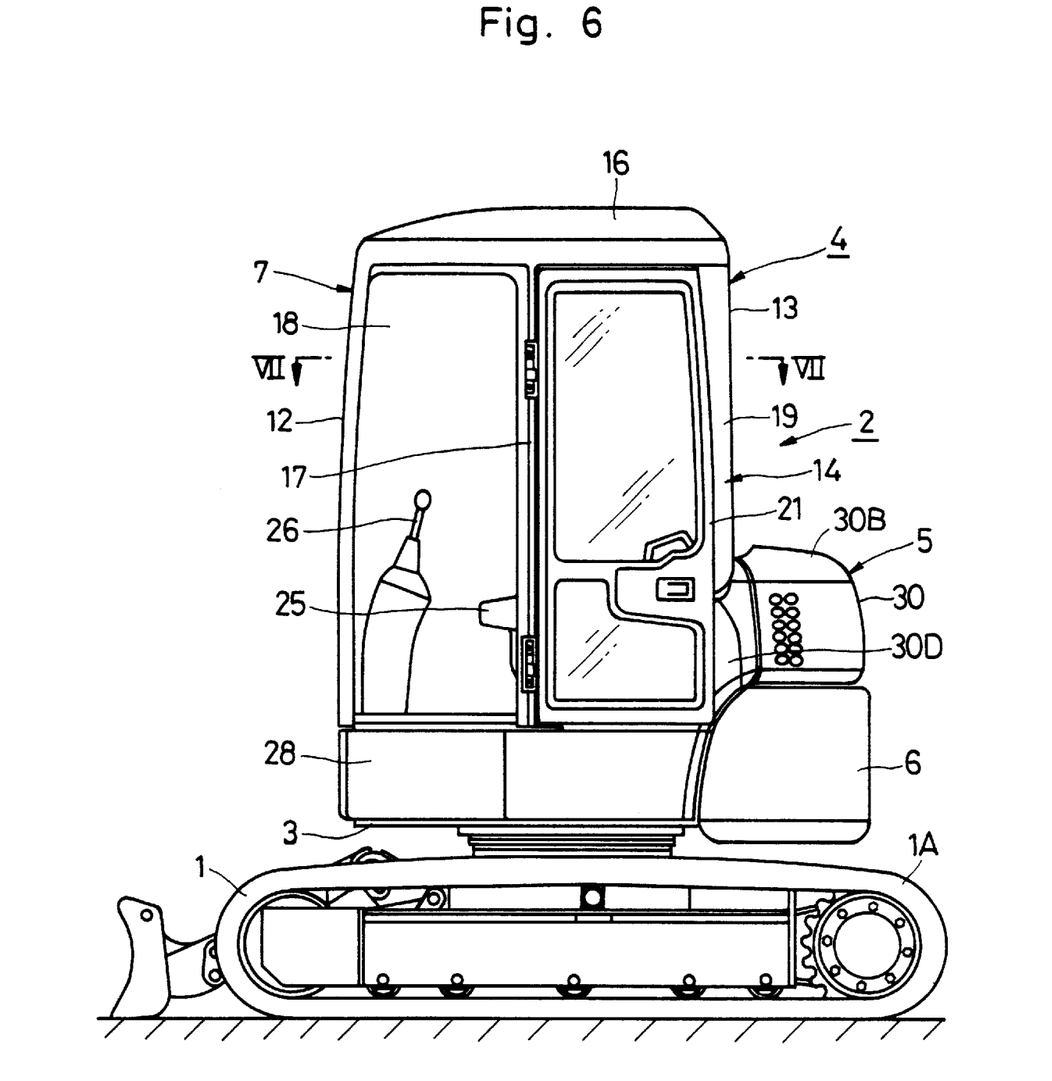
FIG. 6 is a schematic front view similar to FIG. 1 but showing the door of the cab in an opened position.
Figure 7:
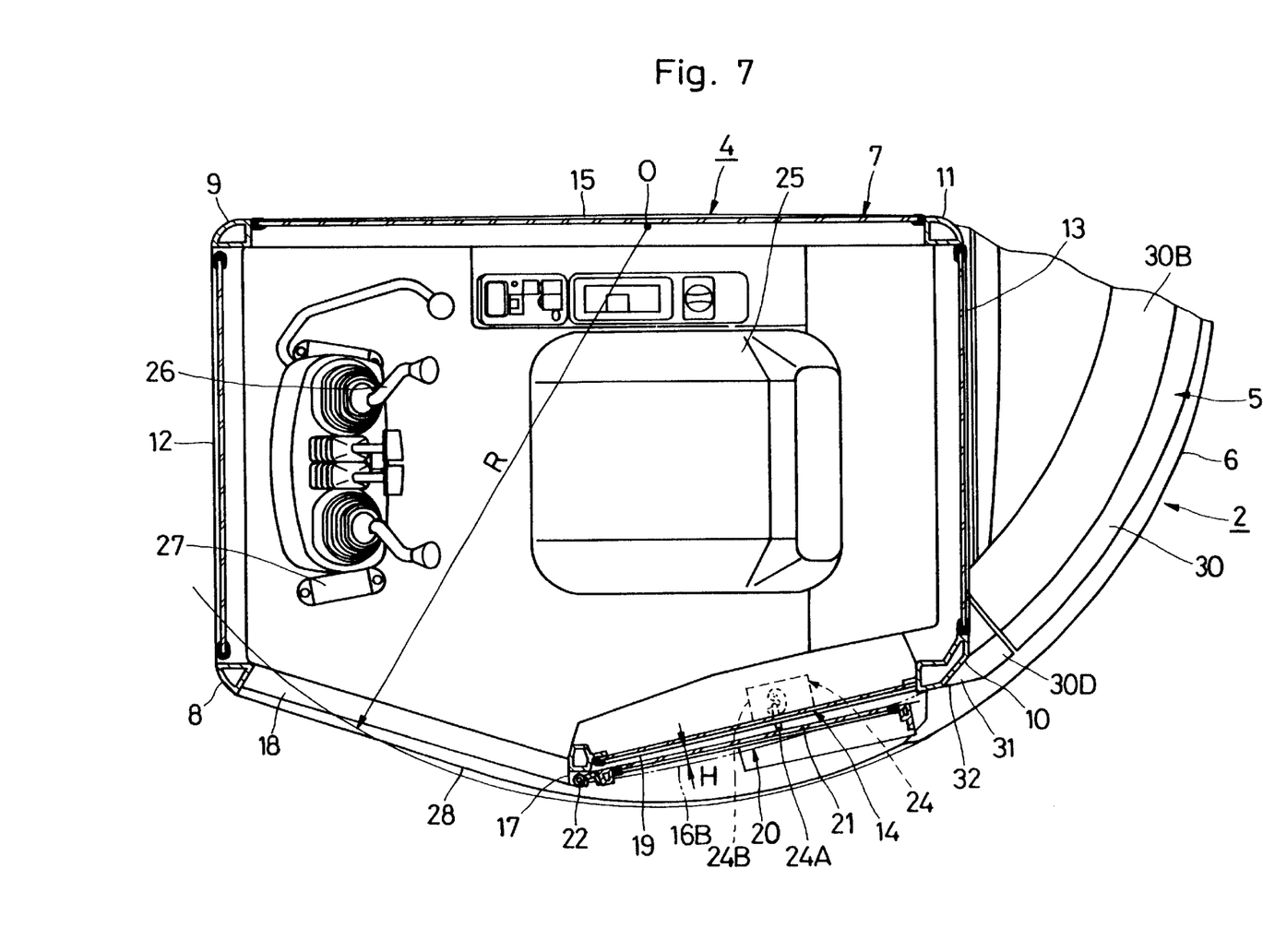
FIG. 7 is a horizontal sectional view taken on line VII—VII of FIG. 6, showing on an enlarged scale the door of the cab in an opened position along with the operator' seat.

The door accommodating space 20 accommodate a door 21 when opened, as shown in FIGS. 6 and 7. The width H of indentation of the side wall portion 19 from the outer marginal edge 16B of the ceiling section 16, namely, the width H of projection of the pent-roof portion of the ceiling section 16 is determined as follows. Assuming that the upper rotary body 2 has a radius of rotational movements R, which corresponds to the distance from its center of rotation O to the rear surface of the counterweight 6 and the distances from the center of rotation O to the right and left crawler belts 1A of the lower truck body 1 as shown in FIG. 2, the width H of indentation is determined such that the door 21 is retained within the radius of rotation R as shown in FIGS. 3 and 7 when it is in an opened state.

Further, regarding the left side enclosure section 14, the center pillar 17 is projected to a leftmost position in the transverse direction. Therefore, the passage opening 18 and the side wall portion 19 of the left side enclosure 14 are disposed in a shallow V-shape on the opposite sides of the leftmost center pillar 17 at the apex of said V-shape. It follows that the ceiling section 16 is formed substantially in a pentagonal shape in conformity with the angularly V-shaped left side enclosure section 14.

The center pillar 17 is slightly inclined inward, gradually from its lower end on the side of the cab floor toward its upper end on the side of the ceiling enclosure section 16. Therefore, the side wall portion 19 is also slightly inclined inward from its lower to upper end. These inclined arrangements contribute to add an attractive taste to the appearance of the cab.

Indicated at 21 is the door which constitutes the operator's cab structure along with the cab box 7. The door 21 is fitted in the passage opening 18 to open and close the latter. On the rear side, the door 21 is hinged to recessed hinge receptacle portions 17A of the center pillar 17 through door hinges 22. The door 21 contains panes of door window glass 21A and 21B.

Figure 5:
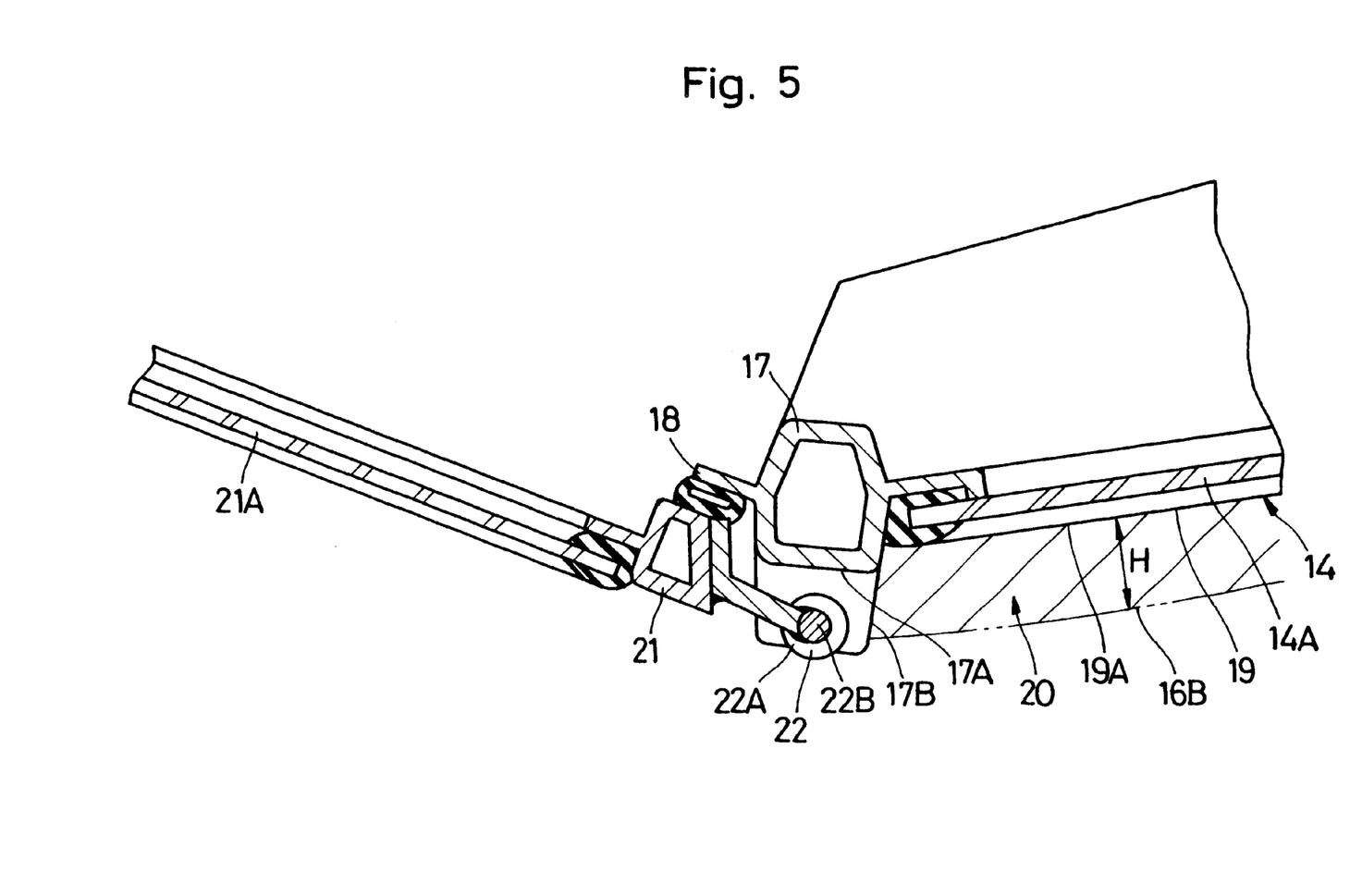
FIG. 5 is a vertical sectional view showing on an enlarged scale a center pillar and a door hinge of FIG. 3.

In this instance, the door hinges 22 are each constituted by a hollow cylindrical coupling member 22A as shown in FIG. 5 which is fixed on the part of the center piller 17, and a cylindrical rod member 22B which is fixed on the part of the door 21 and loosely and rotatably fitted into the cylindrical member 22A from above. Further, as shown in FIG. 5, each door hinge 22 is anchored substantially in an embedded state within one of the recessed hinge receptacle portions 17A on the center pillar 17.

Further, as shown particularly in FIG. 4, the operator's cab 4 is provided with a stepped portion 23 on the left side enclosure section 14 in a rear lower portion of the cab box 7. The stepped portion 23 is held in fitting engagement with an extension portion 31 of a left cover 30D which constitutes an engine cover 30.

Denoted at 24 is an open door lock which is provided in association with the door 21 and the side wall portion 19 of the left side enclosure section 14. The open door lock 24 is constituted by a passive locking portion 24A which is projected on the outer surface of the door 21, and a locking member 24B which is provided on the side wall portion 19 and to be brought into and out of interlocking engagement with the passing locking portion 24A. As seen in FIG. 7, the open door lock 24 functions to lock the cab door 21 in a fully open position to the side wall portion 19, and to prevent the open door 21 from going into spontaneous flapping movements during operation of the construction machine.

Indicated at 25 is an operator's seat which is provided within the cab 4. Provided in front of the operator's seat 25 are various control levers 26 and pedals 27 to be operated by the operator for controlling operations of the lower truck body 1 and working mechanism of the machine.

Figure 8:
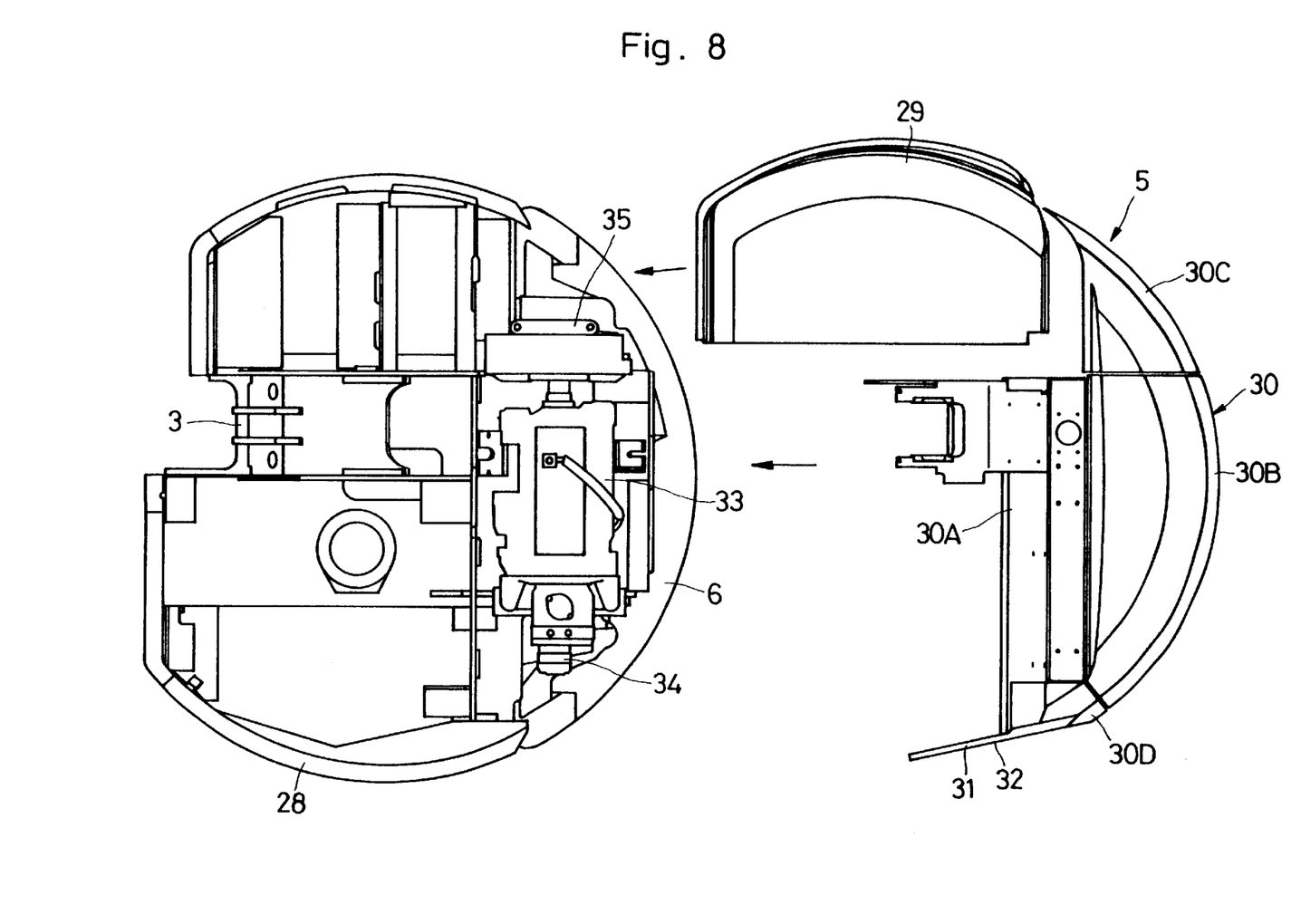
FIG. 8 is an exploded plan view of a side cover and an engine cover separated from a rotary frame.

On the other hand, denoted at 28 is a skirt cover which is attached around the rotary frame 3. This skirt cover 28 is arranged to cover the front side and right and left lateral sides of the rotary frame 3 as shown in FIG. 8.

Further, as shown in FIG. 2, the above-mentioned housing cover 5 is located on the side away from the cab. 4, and, for example, includes a side cover 29 which houses an operating oil tank and a multiple valve system (both not shown), and an engine cover 30 which is provided on the rear side of the cab 4 to house an engine 33 which will be described hereinafter.

In this case, the engine cover 30 is largely constituted by a back cover 30A which is located on the back side of the operator's seat in the cab box 7, a rear cover 30B which can be opened in the fashion of a cover normally referred to as "bonnet" and located in a position on the rear side of the back cover 30A and on the upper side of the counterweight 6, a right cover 30C which is provided on the right side of the rear cover 30B, and a left cover 30D which is provided on the left side of the rear cover 30B. Provided on the front side of the left cover 30D is a front extension portion 31 which is extended forward in such a way as to cover the stepped portion 23 of the cab box 7.

In this instance, the extension portion 31 is provided with a chamfered surface portion 32, which is flush with the side wall portion 19 of the left side enclosure section 14. When the door 21 is opened, the chamfered surface portion 32 serves to prevent the door 21 from coming into contact with the engine cover 30.

The engine cover 30 accommodates an engine 33 which is mounted on the rotary frame 3 transversely extended on the front side of the counterweight 6, along with a hydraulic pump 34 which is connected to the engine 33, and a radiator 35 which is located in the vicinity of the engine 33 as shown in FIG. 8.

With the arrangements just described, the small radius revolving type hydraulic power shovel according to the present embodiment is operated in the manner as described below.

Firstly, the door 21 is opened to get into the operator's cab 4 of the hydraulic power shovel. In this state, an operator can get into the cab through the passage opening 18 which is provided in the left side enclosure section 14. Then, after closing the door 21, the operator gets seated on the operator's seat 25 to manipulate the operation control levers 26 and pedals 27 for operating the lower truck body 1 or working mechanism.

On the other hand, in some case the door 21 is left in a wide open position for the purpose of ventilating the inner space of the cab 4 or when it becomes necessary for the operator to talk to a person outside the machine. In such a case, the passive locking portion 24A of the open door lock 24, which is provided on the door 21, is brought into interlocking engagement with the locking member 24B which is provided on the part of the side wall portion 19.

As a result, the door 21 is locked in the wide open position. At this time, the door 21 is received in the door accommodating space 20 which is defined by the side wall portion 19, ceiling section 16 and center pillar 17. Accordingly, the degree of lateral projection of the door 21 in a wide open position can be reduced to a minimum, and the door 21 can be retained inward of the radius of rotational movements R as determined on the basis of the rear side surface of the counterweight 6. Therefore, even if the door 21 is left in the open position when the upper rotary body 2 is turned around, there is no possibility of the open door 21 being hit against a surrounding structure or structures.

Further, in case it is desired to leave the door 21 in the open position while operating the hydraulic power shovel, it can be securely fixed to the side wall portion 19 by means of the open door lock 24 and thereby prevented from going into spontaneous flapping movements of the door 21 during operation.

As described above, according to the present embodiment, the door accommodating space 20 for the open door 21 is provided on the rear side of the left side enclosure section 14 of the cab box 7. Therefore, when the door 21 is in an open state, its projection of the door 21 from the left side enclosure section 14 can be reduced to a considerable degree. This means that the door 21 can be retained within the radius rotational movements R without narrowing the width of the cab box 7 as a whole, thereby permitting to secure a broad space within and in the transverse direction of the cab 4. Consequently, the cab box 7 according to the present embodiment makes it possible for the operator to work in an improved and more spacious environment, thereby improving the maneuverability of the control levers 26 and pedals 27.

Besides, the door 21 can be locked in an open position by the open door lock 24 which is provided on the door 21 and the side wall portion 19, thereby preventing the door 21 from going into spontaneous cab box 7 and the door 21 if left in the open position in a free state during operation of the machine.

Further, the door hinges 22 which support the door 21 on the center pillar 17 are embedded in sunken portions of the center pillar 17. This arrangement makes it possible to locate the left side enclosure section 14 of the cab box 7 closer to an arc of the radius of rotational movements R in a degree corresponding to the thickness of the door hinges 22, for increasing the width of the cab box 7 as a whole to secure a broad dwelling space and improved working environment.

Furthermore, the front extension portion 31 of the engine cover 30, which is extended in such a manner as to cover part of the cab box 7, is provided with the chamfered surface portion 32 which is formed substantially flush with the side wall portion 19. Therefore, even if the door 21 is opened until it reaches the engine cover 30 as usually is the case with a small radius revolving type hydraulic power shovel, the chamfered surface portion 32 prevents the door 21 from coming into contact with the engine cover 30 to precludes damages to these parts.

On the other hand, the side wall portion 19 which forms a rearmost portion of the left side enclosure section 14 is located in a position which is receded from the outer marginal edges 16B of the ceiling section 16 by a predetermined measure H, so that a pent-roof is formed by the lower side 16C of the ceiling enclosure section 16. As a consequence, when viewed from above, the surface of the ceiling section 16 contains no notches or grooves, and the outer marginal edges 16B of the ceiling section 16 can be formed in a rounded pentagonal shape which contributes to make the appearance of the cab box 7 more impressive.

In the foregoing embodiment, the front extension portion 31 of the engine cover 30 is shown as being located in an overlapping fashion on the lower side of the cab box 7. However, the present invention is not restricted to this particular arrangement. For instance, instead of providing the stepped portion 23 in a lower portion of the cab box 7, the outer surface 19A of the side wall portion 19 may be extended straight to the lower end of the cab box 7.

As is clear from the foregoing detailed description, according to the present invention, a side wall portion of a left side enclosure section of a cab box is located in a receded position inward of the outer marginal edges of a ceiling enclosure section, thereby defining a door accommodating space by an outer surface of the side wall portion, a lower surface of the ceiling section and a rear surface of a center pillar to accommodate an opened door of the cab box. Therefore, when a door of an operator's cab is opened, the opened door can be retained compactly in the door accommodating space with less sideward projection from the left side enclosure section of the cab box. This means that the left side enclosure section can be located in an outer position on an upper rotary body of a construction machine to secure a broader dwelling space within the cab, for providing a more spacious working environment for the operator and improving the maneuverability of control levers and pedals within the cab.

Further, according to the present invention, the left side enclosure section is arranged in a shallow V-shape and has a passage opening and the side wall portion on the opposite sides of a center pillar which is located at the apex of the V-shape. This arrangement is effective in locating the left side enclosure section within the radius of rotational movements of the upper rotary body while securing a broader dwelling space within the cab to provide a spacious working environment.

According to the present invention, door hinges which support the door on the center pillar, are anchored in the center pillar in an embedded state. This arrangement makes it possible to locate the left side enclosure section closer to the radius of rotational movements of the upper rotary body and thus to increase the width of the cab box as a whole to provide a broader dwelling space within the cab.

Further, according to the present invention, the door accommodating space is receded by such a distance as to retain the door in an opened state within the radius of rotational movements as determined by a rear end position of a counterweight on the upper rotary body. This arrangement ensures that, when opened, the cab door be retained within the radius of rotational movements of the upper rotary body. Therefore, even if the cab door is left open during rotation of the upper rotary body, it is securely prevented from hitting against a surrounding structure or structures to increase the reliability of machine operation.

According to the present invention, outer marginal edges of the ceiling enclosure section are formed in a pentagonal shape, and the side wall portion of the left side enclosure is receded by a predetermined measure to form a pent-roof by a lower surface portion of the ceiling enclosure section. When the ceiling section is viewed from above, its outer marginal edges are formed in a rounded pentagonal shape, which contributes to make the appearance of the cab box more attractive.

Further, according to the present invention, an open door lock is provided on the side wall portion of the left side enclosure to lock an opened door to the side wall portion. When the door is opened, it can be locked to the side wall portion of the left side enclosure by the open door lock to prevent the door from going into flapping movements during operation of the machine. This arrangement contributes to prevent damages to the door which might result from spontaneous flapping movements, and to further enhance the reliability of machine operation.

Furthermore, according to the present invention, part of an engine cover which is provided on the rear side of the cab box is extended as far as the side wall portion of the left side enclosure, and this fore extension portion of the engine cover is provided with a chamfered surface portion substantially flush with the side wall portion. Therefore, for example, even in the case of a small radius revolving type construction machine where a cab box and a housing cover are located in an overlapping relation with each other in the longitudinal direction to such a degree as the cab door would normally reach a front extension portion of the housing cover when opened, the chamfered surface portion prevents contact between the door and the housing cover to preclude damages thereto.

What is claimed is:

1. An operator's cab structure for a construction machine, including a cab box mounted on an upper rotary body which is rotatably mounted on a lower truck body, said cab box having enclosure sections on a front side, rear side, left side, right side and top thereof, and a door attached substantially to a center portion of said left side enclosure section and movable between a front closed position and a rear open position, characterized in that said cab box comprises:

a left side enclosure section having a vertical center pillar erected substantially in an intermediate position between front and rear ends thereof, a passage opening to be opened and closed by said door and defined on the front side of said center pillar by bordering edges of said center pillar, front side enclosure section and top enclosure section, and a side wall portion provided on the rear side of said center pillar and circumvented by said center pillar, rear enclosure section and top enclosure section;

said side wall portion being located in a receded position inward of outer marginal edges of said top enclosure section;

said side wall portion being located in a receded position inward of outer marginal edges of said top enclosure section, and defining an open door accommodating space on the outer side thereof in cooperation with a lower side portion of said top enclosure section and a rear side portion of said center pillar to accommodate said door when moved to said rear open position.

2. An operator's cab structure for a construction machine as defined in claim 1, wherein said passage opening and side wall portion of said left side enclosure section are arranged in a shallow V-shape and located on the front and rear sides of said center pillar which is located at the apex of said V-shape.

3. An operator's cab structure for a construction machine as defined in claim 1, wherein said open door accommodating space is located in a receded position by such a distance as to retain said door in said open position inward of a radius of rotational movements of said upper rotary body as determined by dimensions of a counterweight provided on said upper rotary body.

4. An operator's cab for a construction machine as defined in claim 1, wherein outer marginal edges of said top enclosure section are formed in a pentagonal shape, and said side wall portion of said left side enclosure section is located in a position which is receded inward by a predetermined measure from outer marginal edges of said top enclosure section in such a way that a pentagonal shaped roof is formed by a lower surface of said top enclosure section.

5. An operator's cab structure for a construction machine as defined in claim 1, further comprising an open door lock provided on said side wall portion of said left side enclosure section to lock said door in an open position.

6. An operator's cab structure for a construction machine as defined in claim 1, further comprising an engine cover provided on the rear side of said cab box, said engine cover including a front extension portion which is extended as far as said side wall portion of said left side enclosure section and provided with a chamfered surface substantially flush with said side wall portion.

7. An operator's cab structure for a construction machine, including a cab box mounted on an upper rotary body which is rotatably mounted on a lower truck body, said cab box having enclosure sections on a front side, rear side, left side, right side and top thereof, and a door attached substantially to a center portion of said left side enclosure section and movable between a front closed position and a rear open position, characterized in that said cab box comprises:

a left side enclosure section having a vertical center pillar erected substantially in an intermediate position between front and rear ends thereof, a passage opening to be opened and closed by said door and defined on the front side of said center Pillar by bordering edges of said center pillar, front side enclosure section and top enclosure section, and a side wall portion provided on the rear side of said center pillar and circumvented by said center pillar, rear enclosure section and top enclosure section;

said side wall Portion being located in a receded position inward of outer marginal edges of said top enclosure section;

said side wall portion being located in a receded position inward of outer marginal edges of said top enclosure section, and defining an open door accommodating space on the outer side thereof in cooperation with a lower side portion of said top enclosure section and a rear side portion of said center pillar to accommodate said door when moved to said rear open position; and wherein said door is supported on said center pillar through hinges which are embedded in sunken portions of said center pillar.

* * * * *